Sept. 12, 1950 K. W. PFLEGER 2,522,130

CARRIER TELEGRAPH RECEIVING CIRCUIT

Filed June 19, 1947

INVENTOR
K. W. PFLEGER
BY
J. A. McCorkendale
ATTORNEY

Patented Sept. 12, 1950

2,522,130

UNITED STATES PATENT OFFICE 2,522,130

CARRIER TELEGRAPH RECEIVING CIRCUIT

Kenneth W. Pfleger, Arlington, N. J., assignor to Bell Telephone Laboratories, Incorporated, New York, N. Y., a corporation of New York Application June 19, 1947, Serial No. 755,633

6 Claims. (Cl. 178—69)

This invention relates to a telegraph system and more particularly to a telegraph system of the single tone carrier type.

An object of the invention is to improve the operation of a single tone carrier telegraph systems.

A further, and more specific, object of the invention is to provide continuous indication of the amount of thermal noise present on an operating telegraph circuit.

A still further object of the invention is to materially minimize errors in a single tone carrier telegraph system due to the presence of thermal noise.

It has been recognized by communication engineers that carrier telegraph systems of the single tone type are subject to interference due to resistance noise, shot effect and other random noises which collectively have come to be called thermal noise. As a result, the single tone system has been replaced, to some extent, by other types of systems believed to be less susceptible to such interference. However, these newer types of systems are, as a rule, more expensive than the single tone type of system and usually lack certain other advantageous features of the single tone system. There continues to be a definite place for the single tone carrier telegraph system in the communications picture therefore, and, obviously, a feasible method of reducing the known susceptibility of the system to thermal noise would represent a valuable contribution to the art.

A feature of the present invention is means whereby the amount of thermal noise present on an operating telegraph circuit may be continuously measured and indicated without interrupting the normal functioning of the circuit.

A further feature of the present invention is means whereby the magnitude of the bias applied to the telegraph receiving relay is automatically varied as the magnitude of the thermal noise varies.

In accordance with a specific embodiment of the invention the polarized receiving telegraph relay is provided with the usual line winding to which the incoming signals are applied and a first biasing winding to which a constant biasing current is applied which is of proper magnitude so long as a predetermined constant signal-to-noise ratio prevails. In accordance with features of the present invention a second biasing winding is provided to which is applied a biasing current which varies in magnitude as the received thermal noise varies. This varying bias is applied through a novel biasing vacuum tube circuit which will be described in detail subsequently. The noise voltage occurring in the receiving circuit during space intervals (but only during the first space if there are several successive spaces) is utilized to charge a condenser which is connected across the input of the biasing tube circuit.

In general, the correcting method of the present invention is based upon the fundamental assumption that interference during space intervals is much more effective in producing errors than is interference during mark intervals.

A complete understanding of the arrangements contemplated by the present invention and of the operation thereof, as well as appreciation of the various advantageous features thereof will be gained from consideration of the following detailed description and the accompanying drawings in which.

It is the usual practice in the operation of a single tone carrier telegraph system of the general type illustrated to apply the received carrier wave to a rectifier, unwanted high-frequency components being removed by a low-pass filter, and to pass the resulting direct current wave through the line windings of the polarized receiving relay. As well understood by communication engineers, unbiased telegraph signals will result, i. e., in the absence of noise and assuming the filter characteristics to be correct, if there be applied at the same time to the biasing windings of the receiving relay direct current of such magnitude that the resulting ampere-turns are equal to one-half the ampere-turns produced in the line windings of the relay by a long "mark" signal. However, in the event that severe thermal noise should be super-imposed on the received carrier wave, some "space" signals would be received as "mark" signals due to the fact that additional ampere-turns are produced in the line windings of the receiving relay by the rectified "noise" thereby upsetting the desired balance between the ampere-turns of the line windings and those of the biasing windings. (This is assuming, of course, the absence of compensating means such as that contemplated by the present invention.)

Further, some marks will be received as false spaces where the severe (and uncompensated) noise is in opposition to the signal whereby to cause the line ampere-turns to be less than the biasing ampere-turns. This latter effect will be less common than the "false marks" at a given noise level however, depending, as it does, upon the phase as well as the magnitude of the noise.

Obviously, the number of false marks can be reduced by increasing the number of biasing ampere-turns at the expense of increasing the number of false spaces. In view of the fact that the number of false marks tends to exceed the number of false spaces, as pointed out above, a net improvement will result from increasing the number of biasing ampere-turns as the noise increases. The novel arrangement contemplated by the present invention for accomplishing this will be described subsequently; the arrangement referred to provides for automatically varying the biasing ampere-turns accordingly as the average noise power fluctuates from time to time.

Figures 1, 2:
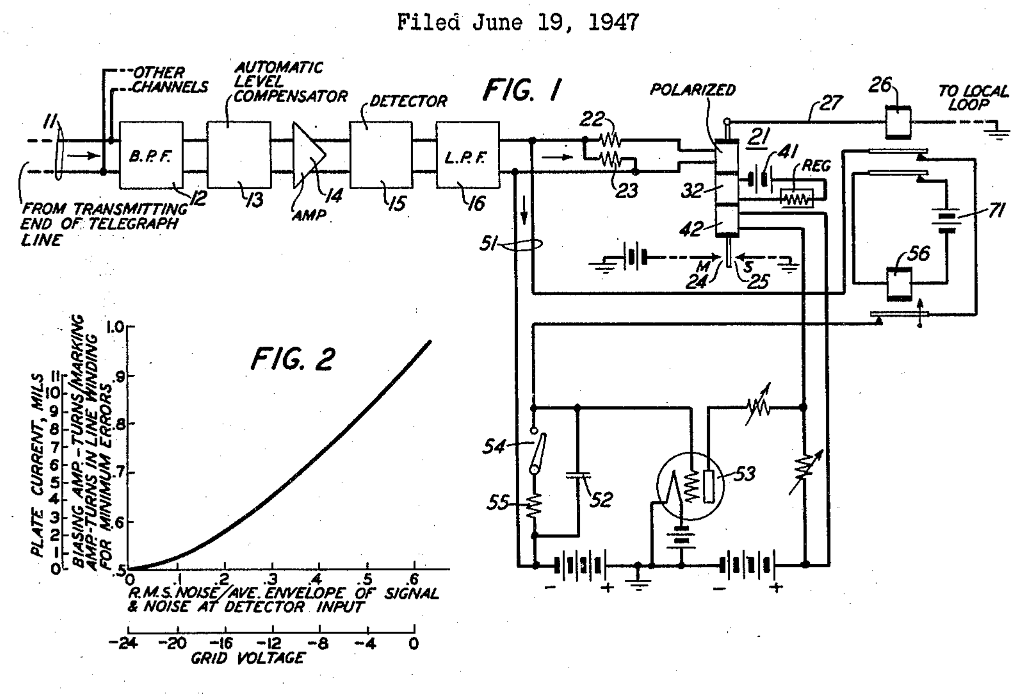
Fig. 1 is a schematic showing of a portion of a receiving terminal of a single tone carrier telegraph system which embodies features of the present invention.
Fig. 2 is a multiple-scale curve, one pair of scales being used to indicate the biasing requirement for the receiving relay of the contemplated circuit and the other pair of scales giving the plate current vs. grid voltage characteristics of a vacuum tube suitable for use in the circuit.

Referring now to Fig. 1, the alternating current signals received over line 11 are either passed by band-pass filter 12 to automatic level compensator 13 or are rejected by the filter and diverted to other channels depending upon the frequency range of said signals. The signals of interest to us in the present discussion are those passed by filter 12 and applied to level compensator 13. Filter 12, which may be of a type well known in the art, is designed to pass only a narrow band of frequencies which includes the band assigned to the channel contemplated by the present detailed description. Automatic level compensator 13 also may be of a type well known in the art, which includes an amplifier and should preferably be so arranged that the amplifier gain is so varied that the average resultant envelope of noise and signal during mark intervals is held constant and, further, that the gain variation is sufficiently slow that there is no appreciable change in gain during a single character but that gradual drifting of circuit equivalent during the course of several characters is fully compensated for.

Amplifier 14 is preferably of a type having a relatively high amplification factor, constant gain and a "linear" characteristic, i. e., the grid voltage vs. plate current characteristic is represented by a straight line. The average envelope of signal and noise applied to the input of detector 15 during mark intervals is held constant therefore and the only variable to be compensated for is noise during space intervals.

The signals are rectified by linear detector 15, which may be of the vacuum tube type, and applied to low-pass filter 16 which acts to remove unwanted high frequency components from the signals.

The direct current signals are now applied to the upper or line winding of polarized receiving relay 21, a resistance pad comprising resistors 22 and 23 being included in the line at this point for purposes of certain level and impedance adjustments.

Operation of relay 21 between mark contact 24 and space contact 25 causes corresponding operation of a telegraph sounder or other indicator in the local loop circuit in a manner well understood. The operating winding of relay 26 is included in series with line 27 over which control of the local loop indicator is exercised.

Receiving relay 21 is provided with the usual biasing winding 32, across which a steady potential is applied from source 41. As indicated, suitable regulating means may be included in the circuit whereby to fix the intensity of the current flowing in biasing winding 32; this biasing current will ordinarily be so adjusted as to insure unbiased telegraph signals under "no-noise" conditions.

Now if noise should come on the circuit, additional biasing ampere-turns should be added as set forth above; receiving relay 21 is provided with an auxiliary biasing winding 42 and it is through this winding that the compensating biasing ampere-turns are effectively added.

Leaving the circuit of Fig. 1 for the moment, reference may be made to Fig. 2 which shows a curve which is common to two different pairs of scales. Considering first one set of scales, the curve may be taken as a showing of the relationship between various values of R. M. S. Noise Average Envelope of Signal and Noise at Detector Input on the one hand and Biasing Ampere-Turns/Marking Ampere-Turns in Line Winding of Receiving Relay for Minimum Errors on the other hand. That is, a compensating current applied to auxiliary biasing winding 42 of relay 21 in the presence of varying noise should follow the curve of Fig. 2 with respect to its magnitude; as shown this current rises from the normal "no-noise" minimum value only slightly at first with increase in noise and later on more rapidly with further increases in noise.

Actually, the required additional ampere-turns are given by the curve if the value "one-half" is subtracted from each figure of the ordinate scale; this subtraction follows from the fact set forth above that for periods of no noise a ratio of one-half is normally maintained between the biasing ampere-turns and the line ampere-turns.

Now applicant had discovered that the Plate Current vs. Grid Voltage curve for a certain vacuum tube, to wit, the Western Electric Company 101-K tube, coincides with the curve of Fig. 2 referred to above when a plate battery of 160 volts is provided and the total direct current load resistance is 5000 ohms; in other words, the desired characteristic for the compensating current is proportional to the curve of Fig. 2 when the plate current-grid voltage scales are used.

Returning now to consideration of the circuit of Fig. 1, a portion of the telegraph signal, after rectification and passage through filter 16, is diverted (when certain circuit conditions, described subsequently, prevail) over line 51 to a portion of the circuit which includes a condenser 52 and a vacuum tube 53 which is presumed to be a Western Electric type 101-K or a vacuum tube having similar plate current-grid voltage characteristics.

As will be now described in detail, the arrangement is such that the voltage across condenser 52 is maintained substantially proportional to the R. M. S. noise and at the correct magnitude. This voltage is obtained by charging condenser 52 over line 51 from the direct voltage at the output of filter 16 when the latter voltage is proportional to the R. M. S. noise; this latter condition prevails only during spaces and only after marking transients have substantially died out. It is necessary, therefore, to include switching means whereby to open line 51 during marks or when marking transients persist. As a practical matter, the elements of the circuit are so established that substantially the same grid voltage is applied to tube 53 (switch 54 being assumed in closed position) even if line 51 be open for the duration of several signal elements. For example, if condenser 52 has a value of 1 microfarad and resistor 55 a value of $10^7$ ohms, the voltage across condenser 52 will drop less than 2% during an open of line 51 of ⅙ second which is about the duration of one character when transmission is at the rate of 60 words per minute; this is a tolerable, almost negligible, voltage variation.

The switching or opening of line 51 referred to is accomplished through the operation of relays 26 and 56. During the reception of mark signals the armature of receiving relay 21 is, of course, in engagement with mark contact 24 and it is assumed that, in accordance with the usual practice, battery is connected to contact 24. Relay 26 operates, therefore, over a path from battery, contact 24 and armature of relay 21, and over line 27 to ground which is assumed to be connected to line 27 in the local loop.

Operation of relay 26 opens line 51 at the inner break contact of the relay and also interrupts the operating circuit of relay 56 at its outer break contact. No voltage is supplied to condenser 52 over line 51 during reception of the mark signal therefore.

Assuming now that a space signal is received the armature of receiving relay will move to space contact 25 which we will assume is connected to ground in accordance with the usual practice; the operating circuit for relay 26 is therefore interrupted and it moves to non-operated position. Movement of relay 26 to non-operated position closes line 51 at the inner break contact of the relay and closes the operating circuit of relay 56 (through battery 71) at the outer break contact.

Relay 26 is preferably fast-release so that it drops back to non-operated position immediately upon the cessation of marking transits at the output of filter 16 whereby substantially the entire portion of the detected wave which is proportional to R. M. S. noise during spaces is impressed across condenser 52.

While the operating path of relay 56 is established by the release of relay 26 as pointed out above, the relay is slow to operate and remains in non-operated position for a period sufficient to permit charging of condenser 52; the condenser charges very rapidly as the impedance of the source as seen looking back towards filter 16 is purposely low. Relay 56 is designed to operate, and open line 51 at its break contact, in time to prevent the building up of transients of the next mark, if a mark is forthcoming, from affecting condenser 52.

If a mark is not immediately forthcoming line 51 remains open at the contact of relay 56 until a mark finally is received whereupon the line is then opened at the inner break contact of relay 26 before relay 56 releases and closes the line at its contact. It is apparent therefore that potential is applied to condenser 52 only during the first of each series of spaces and then only when the voltage is proportional to noise.

As pointed out above the circuit characteristics are such that the voltage applied to the grid of vacuum tube 53 from condenser 52 does not change appreciably even though line 51 be open for the duration of several characters. That is, after the potential across condenser 52 has been fixed during a given space signal it remains at substantially that value until the next space whereupon the potential is then varied in proportion to R. M. S. noise . It is obvious, therefore, that we find in the output of tube 53, and in the auxiliary biasing winding 42 of receiving relay 21, current which varies in accordance with R. M. S. noise and which is in accordance with the curve of Fig. 2. We have as a result a change in the effective biasing ampere-turns of relay 21 which compensates fully for R. M. S. noise impressed on the signals.

While the use of a polarized relay has been described, it is contemplated that, on occasion, a neutral type relay may be utilized with the line and biasing currents superimposed on the operating winding thereof in predetermined relative directions.

Figure 3:
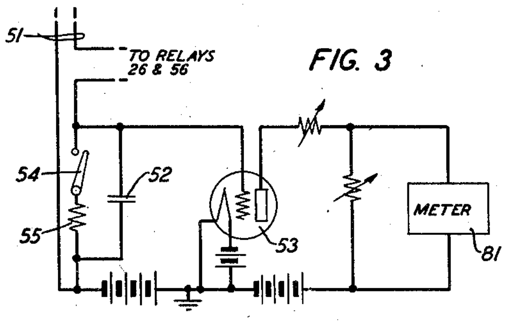
Fig. 3 shows a modification of a portion of the receiving terminal which provides a meter for continuously indicating the noise level present on the operating telegraph circuit.

Referring now to Fig. 3, there is illustrated, a modification of the arrangement in accordance with which the varying output current of the vacuum tube, instead of being applied to the receiving relay, is applied to meter 81. Meter 81 is suitably calibrated to indicate noise level and thereby provides continuous indication of the noise level on the operating telegraph circuit. The attendant may observe the meter and, when noise above an undesirable level is indicated may take appropriate action. In general, the arrangement and operation of the circuit is similar to that of Fig. 1 which was described in detail above.

Figure 4:
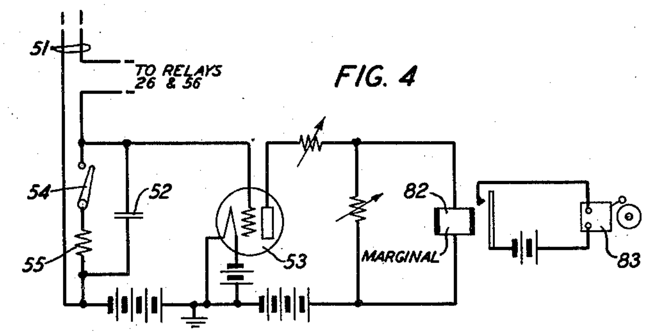
Fig. 4 shows a further modification which provides an alarm for indicating when the noise level reaches a predetermined value.

A still further modification of the arrangement is illustrated in Fig. 4; in accordance with this arrangement an alarm is given upon the noise level reaching a predetermined point. In this case, the varying output of the vacuum tube, instead of being applied to the receiving relay, is applied to marginal relay 82. Relay 82 is so adjusted that it will operate only when the current exceeds a predetermined magnitude which corresponds to a "dangerous" noise level. Operation of relay 82 completes the operating circuit of a suitable alarm, such as bell 83, thereby warning the attendant that "mutilated copy" may be received. In general the circuit operates in a manner similar to that of Fig. 1 described in detail above.

It is contemplated also that either a meter similar to that of the embodiment of Fig. 3 or an alarm-controlling marginal relay similar to that of the emodiment of Fig. 4 may be connected in series with the auxiliary winding (winding 42, Fig. 1) in order to achieve metering or alarm means with compensation or, further, that both the meter and the marginal relay may be so connected whereby to provide all three features at the same time, i. e. compensation, metering and alarm means.

While certain specific embodiments of the invention have been selected for detailed description above, the invention is, of course, not limited in its application to such embodiments. The embodiments described should be looked upon as illustrative rather than as restrictive.

What is claimed is:

1. A receiving circuit for a carrier telegraph system subject to interference due to thermal noise including a receiving relay, a line winding for said relay, means for applying received signals to said line winding, a circuit for applying biasing current to said relay, capacitive means connected to be charged by the signals which are applied to said line winding, means for disconnecting the charging circuit for said capacitive means during the reception of mark signals, a circuit connected to said capacitive means to derive a current which varies in proportion to the charge on said capacitive means, and means connecting said last named circuit to said bias-applying circuit for continuously applying said current to said bias-applying circuit.

2. The combination according to claim 1 and means for disconnecting the charging circuit for said capacitive means during the reception of space signals following the first space signal which is immediately subsequent to a mark signal.

3. A receiving circuit for a single tone carrier telegraph system for transmitting marking and spacing signals by interrupting the carrier wave, said system subject to interference due to thermal noise and including a receiving relay, a line winding for said relay, means for applying received signals to said line winding, a biasing winding for said relay, neutralizing means responsive to the interference to which said line winding is subjected, means comprising said last-named means for applying to said biasing winding a current which varies as the magnitude of said last-named interference, means for rendering said neutralizing means unresponsive during the reception of mark signals, and means for rendering said neutralizing means unresponsive during the reception of transient currents caused by the building up of said mark signals.

4. A receiving circuit for a single tone carrier system for transmitting marking and spacing signals by interrupting the carrier wave, said system subject to interference due to the thermal noise and including a receiving relay, a line winding for said relay, means for applying received signals to said line winding, a biasing winding for said relay, neutralizing means responsive to the interference to which said line winding is subjected for deriving a biasing current from said last-named interference, means for applying said current to said biasing winding, said current being, for any given value of received interference, of substantially the minimum magnitude necessary to compensate for the effect produced by said interference in said line winding, means to render said neutralizing means unresponsive during the reception of mark signals, and means for rendering said neutralizing means unresponsive during the reception of transient currents incidental to the building up of said mark signals.

5. A receiving circuit for a single tone carrier telegraph system subject to interference due to thermal noise including a polarized receiving relay, a line winding for said relay, a first biasing winding for said relay, means for applying received signals to said line winding, means for applying a fixed biasing current to said first biasing winding, a second biasing winding for said relay, a compensating circuit including a multielectrode vacuum tube, a condenser, means for continuously applying the output of said condenser to the grid of said vacuum tube, means for applying to said condenser a potential which varies only in accordance with the magnitude of thermal noise to which said line winding is subjected, said noise chiefly comprising noise freqeuncies equal to the frequencies contained in said received signals, means for continuously applying the output of said vacuum tube to said second biasing winding and means for preventing the application of said potential to said condenser during the reception of mark signals by said receiving circuit, the plate current versus grid voltage characteristics of said vacuum tube being such that the variations in the output of said vacuum tube applied to said second biasing winding are of proper magnitude to compensate for the effects of thermal noise.

6. A receiving circuit for a single tone carrier telegraph system subject to interference due to thermal noise including a polarized receiving relay, a line winding for said relay, a first biasing winding for said relay, means for applying received mark and space signals to said line winding, means for applying a fixed biasing current to said first biasing winding, a second biasing winding for said relay, a multielectrode vacuum tube, a condenser, means for continuously applying the output of said condenser to the grid of said vacuum tube, a circuit for applying to said condenser a potential which varies only in accordance with the magnitude of thermal noise to which said line winding is subjected, said noise chiefly comprising noise frequencies equal to the frequencies contained in said received signals, a relay associated with said applying circuit effective upon operation to open said circuit and prevent the application to said condenser of said potential, means for continuously applying the output of said vacuum tube to said additional biasing winding, and means for causing the operation of said last-mentioned relay during the reception of mark signals by said receiving circuit, the plate current versus grid voltage characteristics of said vacuum tube being such that the variations in the output of said vacuum tube applied to said second biasing winding are of proper magnitude to compensate for the effects of thermal noise.

KENNETH W. PFLEGER.

REFERENCES CITED

The following references are of record in the file of this patent:

UNITED STATES PATENTS

| Number | Name | Date |
|---|---|---|
| 1,752,303 | Kelley | Apr. 1, 1930 |
| 1,752,330 | Clapp | Apr. 1, 1930 |
| 1,752,346 | Kelley | Apr. 1, 1930 |
| 1,996,042 | Erickson | Mar. 26, 1935 |
| 2,249,323 | Mitchell | July 15, 1941 |